United States Patent [19]
Broding et al.

[11] 3,806,864
[45] Apr. 23, 1974

[54] CABLELESS SEISMIC DIGITAL RECORDING SYSTEM

[75] Inventors: Robert A. Broding; Francis R. Freeman, both of Tulsa, Okla.

[73] Assignee: Amoco Production Company, Tulsa, Okla.

[22] Filed: Nov. 6, 1972

[21] Appl. No.: 298,153

[52] U.S. Cl.... 340/15.5 TS, 346/14 MR, 346/33 C, 340/15.5 DP
[51] Int. Cl. .......................... G01v 1/16, G01v 1/36
[58] Field of Search ................. 346/33 CE, 14 MR; 340/15.5 TS, 15.5 DP; 343/6.8; 325/6

[56] References Cited
UNITED STATES PATENTS

| | | | |
|---|---|---|---|
| 3,062,315 | 11/1962 | Herzog......................... | 340/15.5 TS |
| 3,389,391 | 6/1965 | Keeler et al...................... | 343/6.8 R |
| 3,713,148 | 1/1973 | Cardullo et al. ................. | 343/6.8 R |
| 3,356,990 | 12/1967 | Sloughter..................... | 340/15.5 TS |
| 3,283,295 | 11/1966 | Montgomery................ | 340/15.5 TS |
| 3,721,950 | 3/1973 | Jorgensen et al. ............... | 340/6.8 R |
| 3,531,771 | 9/1970 | Jaxhrimer et al.............. | 346/14 MR |

Primary Examiner—Maynard R. Wilbur
Assistant Examiner—N. Moskowitz
Attorney, Agent, or Firm—Newell Pottorf; Paul F. Hawley

[57] ABSTRACT

In cableless seismic recording, each seismic trace is digitally recorded by a separate small portable magnetic recorder placed near the corresponding seismometer group. First, out of a large number of seismometer groups and small recorders spaced over an area or along a profile line, only the specific recorders needed for a given set of record traces are turned on from a control point, typically at the seismic source location, by transmitting a set of coded signals over a communications link. Next, a record header block of identification and recording parameter data, partly transmitted from the control point and partly supplied by the portable unit, is recorded on the tape by transfer from temporary storage in the unit. Finally, immediately following the end of the header, are recorded the zero-time mark and the timed sequence of digitized seismic trace data. For the next and each following record, the process is repeated except that the coded signal set is modified as necessary to turn on only the appropriate trace recoders.

9 Claims, 4 Drawing Figures

CABLELESS SEISMIC DIGITAL RECORDING SYSTEM

1. Field of the Invention

This invention relates to seismic geophysical surveying, and is directed to a field system for digitally recording seismic signals without the need for multi-conductor cables or alternate means for transmitting the received seismic signals from the seismic-spread detectors to a central recording point. In particular, the invention is directed to a field seismic recording system utilizing small portable recording units placed near the seismometer locations and arranged to be selectively turned on and operated for making individual-trace recordings, by signals transmitted from a central control point over a communications link.

2. Description of the Prior Art

Substantially since the beginning of large-scale use of seismic geophysical surveying, it has been customary to place seismometers at the spaced-apart points on the ground surface where it is desired to receive seismic waves and to connect the individual seismometers or groups of seismometers by multiple-conductor cables to a recorder at a central point. There all of the received signals are recorded on the various channels of a multiple-channel recorder. Where very large numbers of seismometers are used and/or they are dispersed over considerable distances, the providing and maintaining of the multiple-conductor cables between the seismometers and the recorder represent a substantial part of the investment and crew-operating costs. Proposals to replace the cable system with a multiple-channel radio-transmission system have been made but have apparently not been acceptable, probably due to problems of government licensing, noise, distortion, cross-talk, and maintaining channel separations in a frequency band of limited width. Besides being vulnerable like cables to interference, conventional radio-transmission systems require a supply of substantial electrical power at each remote seismometer location for making the transmission, thereby increasing the weight, cost, size and handling expense of the remote units.

Some of the problems associated with radio-transmission seismic systems have been solved by the system proposed in Montgomery Pat. No. 3,283,295, where a radio receiver and a small magnetic recorder are located at each seismometer group position of a seismometer spread and are actuated by control signals from a centrally located transmitter. This is an important simplification, in that the remote receiver and small recorder have reduced size, weight, and power requirements as compared with the prior transmitter units. There are, however, in the Montgomery system two deficiencies that have become of increasing importance since the time Montgomery filed his application: (1) his recording of the seismometer signals as a frequency-modulated magnetic trace has been almost entirely supplanted by digital-trace recording, which has unexcelled accuracy, dynamic range and freedom from noise interference; and (2) there is no provision for selectively turning on the recorder units for any given recording, so that only part of the recorders of a larger array laid out along the ground surface can be employed as in the "roll-along" technique of common-depth-point shooting. All of Montgomery's laid-out recorder units are in operation for any one recording, and changing the array for each new record involves physically moving some of the remote receiver-recorder units along the survey profile line.

It is the primary object of the present invention to provide a novel and improved field seismic-recording system of the type shown by Montgomery wherein these two noted deficiencies of Montgomery are overcome, in that the recording produced is digital in form and, out of a large array of seismometers and recording units laid out in a prospect area, only those recorders needed for producing a given set of record traces can be selectively energized and caused to record the desired traces. The remaining laid-out recorders stay essentially quiescent until it is desired to record traces representing the receiving areas where they are situated.

SUMMARY OF THE INVENTION

Briefly stated, the foregoing and other objects of the invention are accomplished by using a plurality of small portable magnetic recorder units each placed near and connected to one seismometer group for recording one trace of a multiple-trace record. Each recorder unit of a large number of such units and corresponding seismometers or seismometer groups spread over an area is preset to be responsive to and turned on by a different one of a set of coded signals that can be transmitted over a communications link to all of the recorders. First, in making a record, the set of coded signals sent out to all recorder units contains only those coded signals corresponding to the preset responses of the recorders desired to be turned on. As soon as the last one of the desired group of recorders is energized, a record-header block of identification and recording-parameter data is transmitted from the control point and written digitally on all tapes, together with other identification and recording data peculiar to each recorder unit. Immediately following, are recorded a zero-time mark and then the timed sequence of digitized seismic-trace data from the adjacent seismometer group. At the end of the desired recording time, all units automatically shut down, reset themselves, and assume radio standby status in readiness for the next turn-on and digital recording sequence. Those units of the larger array not receiving the particular coded signal necessary for them to turn on, remain in an intermediate standby status without any movement of the recording tape.

As the recording unit and tape are thus utilized only as needed, each unit normally has sufficient recording capacity for all of the records that are to be made with the unit at a given location. When its location and that of its connected seismometers are to be changed, the recorded tape will normally be removed and a fresh supply of blank recording tape inserted.

Ordinarily, the recorded tapes are sent or taken to a central location for playback and storage of the data in any desired form and format of digital-computer storage and work tape. Once this transcription has been performed, the field-tape cassettes may be erased and returned to the field work location for further use.

As multi-trace recordings in the usual sense are not ordinarily made at the field operating location, the need for the usual multiple-channel seismic field-data recorder is obviated. Accordingly, a relatively simple control unit is all that is required to conduct field operations utilizing the individual trace-recording units of the present invention. Primarily, it is the function of the control unit first to generate and send out a particular set of coded signals necessary to turn on the desired recording units. Then the control unit transmits the record-header data comprising identification and recording parameter data, and finally is transmitted a zero-time mark coincident with the start of seismic-wave generation followed by clock pulses to time the sampling and digitizing of the seismic data. For these purposes, the control unit includes means by which the coded signals can be selected and automatically transmitted and by which the appropriate record-header information can be set in for transmission. Preferably, the transmission is over an ordinary communications-radio link, but is could equally well utilize an inexpensive twisted pair of insulated wires. As the transmitted signals occupy only a relatively limited frequency range, a high-quality, expensive transmission line is unnecessary.

DETAILED DESCRIPTION OF THE DRAWINGS

Figure 1:
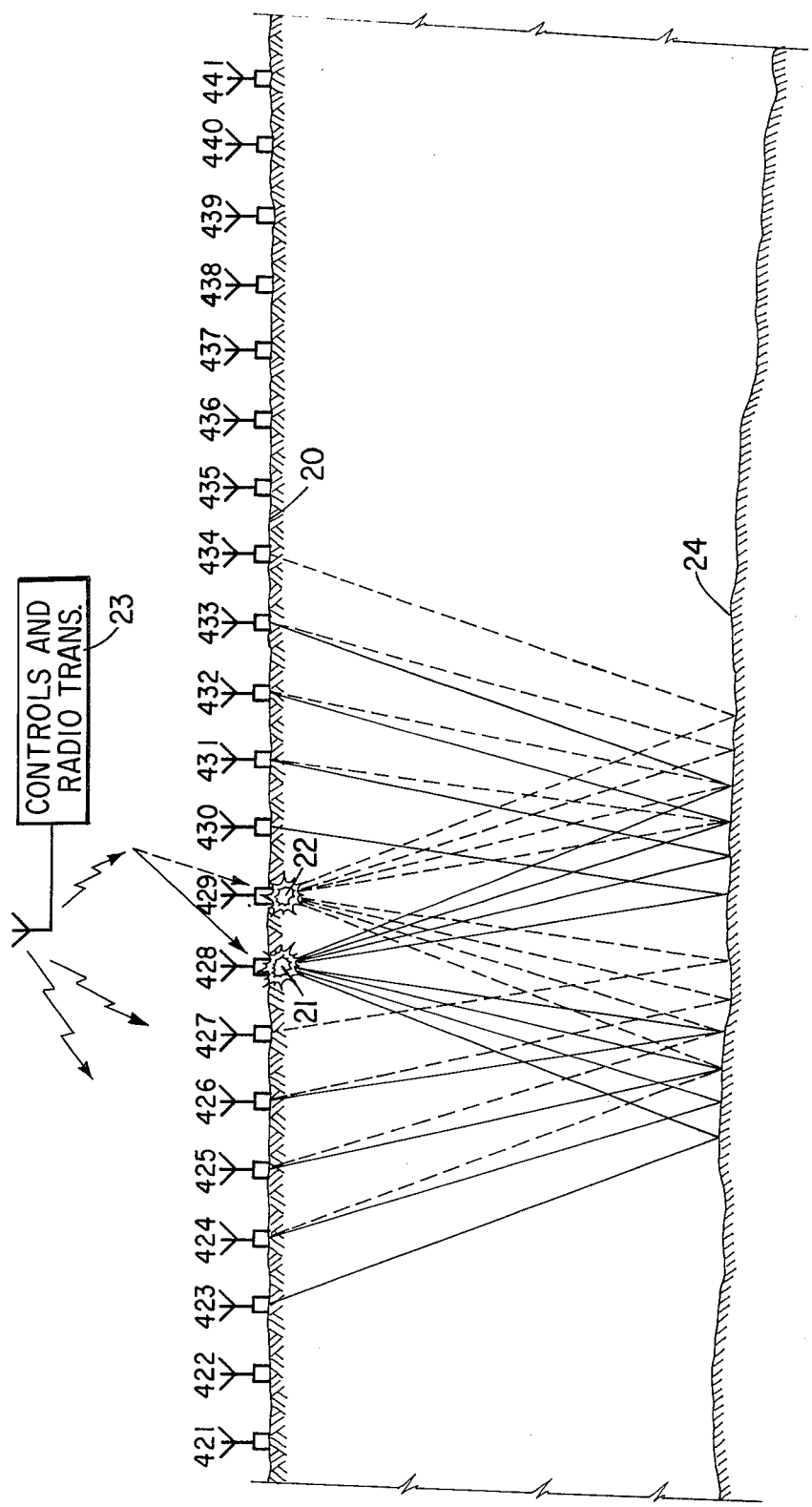
FIG. 1 is a diagrammatic earth cross section showing a field surveying operation using the invention.

Referring now to the drawings in detail and in particular to FIG. 1 thereof, this figure shows in diagrammatic fashion an earth cross section with an embodiment of the invention in position for recording seismic data. Spaced at equal intervals along a profile survey line extending along the earth's surface 20 are individual seismic recorder units 421–441, each comprising a radio receiver unit including an aerial and a small magnetic tape recorder, preferably of the cassette type. Each unit is connected to at least one seismometer, and preferably to the group of inter-connected seismometers producing a single output to be recorded as one record trace, in the manner customary in seismic geophysical surveying. At or near the positions occupied by units 428 and 429 are respectively shown diagrammatically a first seismic-wave source 21 and a second seismic-wave source 22. At any convenient central location, and typically in association with source 21 or 22, there is a control unit 23 containing a radio transmitter and control circuits to be subsequently described, which unit controls and coordinates the operation of recording units 421–441.

This arrangement of seismometer groups and wave sources is a simplified representation of a conventional roll-along type of common-depth-point surveying operation, the ray paths of the seismic waves from source 21 reflected by a subsurface interface 24 to certain of recording units 421–441 being shown by solid lines, while the corresponding ray paths of waves emanating from source 22 are shown as dashed lines. Reflected waves having 21 as their source are received and recorded at receiving recorders 423–426 and 430–433, whereas waves from source 22 are detected and recorded at receiving recorders 424–427 and 431–434. That this is a typical form of common-depth-point roll-along shooting operation is made apparent by the common-depth points on the interface 24 where reflection occurs for both the solid and the dashed-line ray paths.

To operate in accordance with the present invention, the various seismometer groups are first laid out on the ground surface at pre-measured locations along the survey profile line, and each group output is electrically connected to the amplifier input terminal of the corresponding one of recorders 421–441. For purposes of illustration it may be assumed that the reference numbers 421–441 function also as identification numbers for the seismometer group locations. As each seismometer group and recorder is place at its location, that location number is set into the recorder to become both the coded signal which will subsequently activate it, as well as the unit position identification to be recorded as part of the record header information. For example, when recorder 425 and its associated seismometer group are set in position and connected together, the numerals "4", "2", and "5" are manually set on its call-code dials, typically three 10-position thumb-wheel switches. The binary coded decimal (BCD) equivalent of 425, namely 0100 0010 0101, becomes the address-code signal that is to be sent out by control and transmitter 23 whenever recorder 425 is to be activated for recording a seismogram trace.

Specifically, in preparing to record from source point 21, control unit 23 sends out, over the radio communications link to all of receiving recorders 421–441, a set of eight coded address signals so chosen that only recorders 423–426 and 430–433 are fully turned on for recording, the rest of the units remaining quiescent. As soon as all the eight chosen recorders are turned on and operating, control unit 23 transmits a block of record header information identifying location 428 as the source point, as well as giving other conventional information such as crew indentification, date, time, and the like. This information is recorded by all of the eight operating recorders, together with unit-identifying information, recording parameters, and the like, for each recording unit. Then follows closely a zero-time impulse marking the start of generation of seismic waves by the source 21, which is immediately followed by timing impulses which synchronize the sampling times of the seismic data being picked up by the seismometers connected to the operating recorders. At the end of a preset recording interval, all of receiving recorders 421–441 return to a radio-standby status in readiness for the next recording.

For recording from source point 22, the eight active recording units are shifted one profile position to the right from those used for recording from source 21. Control 23 thus sends out a modified set of coded address signals to which only recorders 424–427 and 431–434 respond by turning on. Again is transmitted and recorded the appropriate modified record header information, immediately followed by a timebreak marking the generation of waves at point 22, followed by the sampling impulses controlling digitizing and recording of the received-wave data at the activated recorders. Again these recorders shut down and return to standby status at the end of the recording period. In the above manner, seismic waves are successively generated at locations 430, 431, 432 and so on until all desired generation and receiving points along the profile survey line have been occupied. As will be apparent, the showing of only eight recording units in operation is to simplify the example and avoid confusion on the drawing. A more typical number of active recorders and traces for each field record would be 24, 36, or more, with seismometer-group and recording-unit spacings of the order of 300 feet. Nevertheless, the principle of operation is the same as described above.

Figure 2:
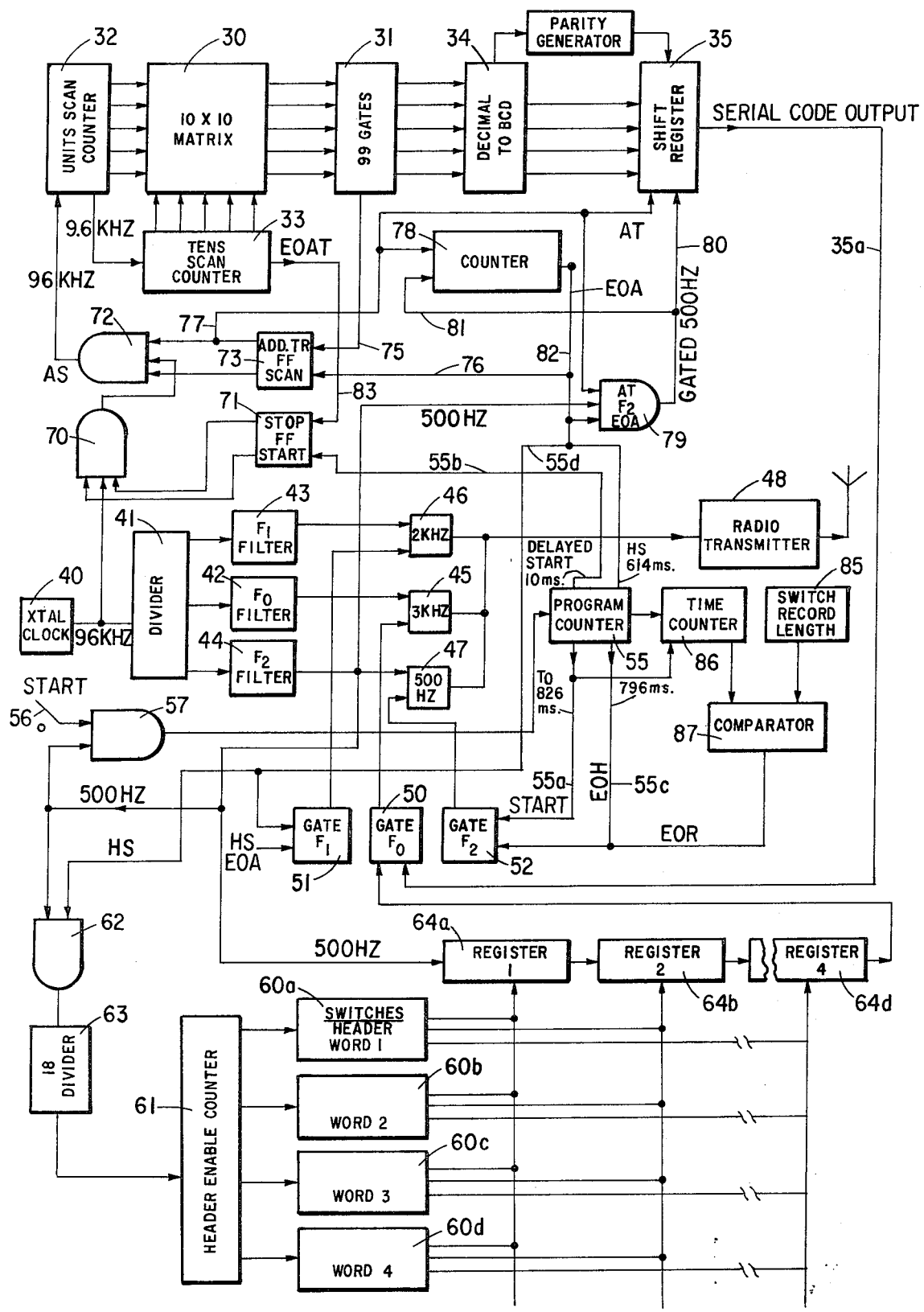
FIG. 2 is a block wiring diagram of the control unit used in the system of the invention.

Referring now to FIG. 2, this figure shows in somewhat detailed block diagram form the principal units making up control unit 23 which controls the over-all operation of the field recording system. In general, the upper portion of FIG. 2 is a switching matrix for the selection of the desired set of coded address signals and the generation and transmission of these signals to activate the specific recording units desired for any particular set of record traces. The center portion of FIG. 2 comprises a generator for precise tone frequencies both to control and operate the system and to serve as a time reference, as well as program or time counters for precisely controlling record length and the generation and transmission of the record-header data for recording. The lower portion of FIG. 2 comprises generally the record-header information block including means for introducing desired record identification and recording parameter data and putting them into a form suitable for radio transmission to the activated remote receiving recorder units.

This block diagram is essentially that employed in a prototype control unit. As a simplification of the 3-digit codes of FIG. 1, the code-signal selection and generation employed in the prototype unit was based on any of 99 two-digit decimal numbers starting with 01 and ending with 99. Thus, a two-dimensional array or matrix 30 of 99 contact points had an insulated electrical conductor extending from each point to one of 99 gate units in a gate array 31. Selections of matrix points of corresponding two-digit numbers were made by applying a voltage to the corresponding matrix points immediately prior to initiating a recording. Detection of the selected matrix points and generation of the corresponding coded signals were carried out by electronically scanning all of the matrix points in turn, for example, in a raster pattern, as controlled by a pair of scan counters 32 and 33, which in effect moved from point to point of the matrix until a selected point was found. Scanning stopped momentarily while the selected point, through its corresponding one of gate units 31 energized a decimal to binary-coded-decimal (BCD) converter 34 which, for each of the two digits of the number making up the selected point, generated the corresponding four-binary-bit code plus a parity bit. The resulting ten bits of information were placed in a shift register 35 and clocked out in sequence for transmission to the receiver recording units at the sampling-rate frequency.

The time base for the control unit and for the recording operation was provided by a conventional piezoelectric crystal oscillator or clock 40 operating at, for example, a frequency of 96 khz into a multiple-output frequency-divider circuit 41 producing through the three filters 42, 43 and 44 tone signals at frequencies of 3,000, 2,000 and 500 hertz, respectively. These were selectively fed to a conventional radio communications transmitter 48 through the respective input control gates 45, 46 and 47. Enable or inhibit voltages were supplied to gates 45, 46 and 47 by the respective flip-flops or gates 50, 51 and 52.

The over-all timing and control of the recording operation was provided by a program counter or divider 55, which, after the enabling of a gate 57 by a start pushbutton 56, counted cycles of the 500-hz sampling frequency, and at adjustable, predetermined intervals of time after the starting count output various enabling pulses or voltages to different parts of the control system.

Referring to the bottom portion of FIG. 2, the information to be transmitted and recorded at each of the remote recorder units comprising the record-header information was manually preset on a number of word units 60a, 60b, 60c, 60d, each employing, for example, thumbwheel switches by which any required number of alphanumeric characters could be preset. As the basic format was made up of 18-bit words containing 16 information bits, a parity bit and a sync bit, the transmission of the preset header information was under control of a gate unit 62 transmitting 500-hz pulses to an 18-divider 63, which on every 18th count of a bit transmitted a pulse to a header-enable counter 61. This counter controlled the transfer of each header word in turn to a set of output registers 64a, 64b, 64d, from which the word was clocked out serially for radio transmission to the energized remote recorder units by 500-hz clock pulses taken from the output of filter 44.

Clock pulses at 96 khz to actuate the rapid scanning of matrix 30 by counters 32 and 33 were taken directly from the output of clock 40 through gates 70 and 72 in series, gate 70 being under control of enabling or inhibit voltage from a flip-flop 71, while gate 72 was similarly controlled by a flip-flop 73. Scanning of matrix 30 was started by a voltage pulse from program counter 55 over output lead 55b to the start terminal of flip-flop 71. With gate 72 enabled by flip-flop 73, address-scan (AS) pulses at the rate of 96 khz flowed to units scan counter 32 causing it to scan one point of matrix 30 with each 96-khz impulse. Each tenth impulse was transmitted to tens counter 33 to increment it by one matrix row. Accordingly, 99 impulses occurring in this slightly more than one millisecond were all that was required for a complete scan of matrix 30 if no points had been selected therein for generation of corresponding coded signals. After the scan passed the matrix point corresponding to number 99, counter 33 generated an end-of-address-transmission pulse (EOAT), which traveled over conductor 83 to flip-flop 71 to cause it to stop the scanning.

Assuming, however, that one or more of the number points in matrix 30 had been selected for transmission of corresponding coded signals, as soon as the first selected point was reached in the scan, gate array 31 generated an interrupt impulse on lead 75 which actuated flip-flop 73 to interrupt the scanning. Flip-flop 73 also applied to lead 77 an address transmission voltage (AT) which functioned as an enabling voltage for a counter 78, for the shift register 35 and for a gate 79. Gate 79 accordingly began transmitting 500-hz impulses to its output lead 80 and to shift register 35, and via lead 81 to the input of counter 78. Simultaneously with the interrupt pulse on lead 75, the actuated gate in array 31 initiated generation of two binary coded digits by unit 34 which were immediately placed in shift register 35. As each digit required four bits plus a parity bit, the resulting 10 bits in shift register 35 were shifted out serially by the 500-hz clock pulses on lead 80 to register output lead 35a going to gate 50, where they modulated the transmission of the 3-khz $F_0$ frequency, a "one" bit corresponding to a burst of 3-khz frequency 2 milliseconds in length, while a "zero" bit was the absence of 3 khz for 2 milliseconds. At the end of the 20-millisecond interval corresponding to 10 counts by counter 78, the counter put out an end-of-address pulse (EOA) on lead 82 which inhibited gate 79 and, transmitted over lead 76, caused flip-flop 73 to resume scanning the matrix 30 by pulses through gate 72. Simultaneously, the end-of-address pulse was applied to gate 51 to produce a 2-millisecond burst of the 2-khz $F_1$ frequency over radio transmitter 48.

The sequence of operations as established by program counter 55 was this. Pressing start button 56 caused immediate emission of a pulse from counter 55 over output lead 55a to trigger gate 52 and start transmission of the 500-hz tone by radio 48. After a short delay for circuit stabilization, such as 10 milliseconds, a voltage impulse on lead 55b initiated the rapid scanning of matrix 30. The alternate scanning of matrix 30 and sending out, ove lead 35a and radio 48, of the corresponding BCD coded address signals continued until completed. Immediately thereafter, typically at a time of 614 milliseconds, counter 55 developed on its output lead 55d a header-start voltage (HS) which was applied to gate 79 as an inhibit command to stop the further passage of 500-hz clock pulses, and to gate 62 as an enabling voltage Accordingly, the header words stored in units 60a–60d were transmitted in turn to registers 64a–64d to be clocked out as a succession of binary coded decimal (BCD) bits in series through gate 50 as on-off modulation of the 3-khz tone going to radio transmitter 48. Subsequently, at a suitable time such as 796 milliseconds, counter 55 put out on lead 55c an end-of-header impulse (EOH) which caused gate 52 to shut off the transmission of 500-hz tone through gate 47. Next, at the end of a 30-millisecond gap in the 500-hz tone transmission, namely at 826 milliseconds, counter 55 emitted a time-zero pulse on lead 55a to restart the transmission of 500-hz tone, which pulse coincided with the start of seismic-wave generation. This tone transmission continued and served as a synchronizing and sampling-time clock for all of the operating receiver recorders until a preset time interval for the desired record length passed, whereupon an end-of-record (EOR) pulse was applied through gate 52 to terminate transmission through gate 47. The desired record length in seconds could be preset on a switch means 85, the setting of which was compared by a comparator 87 with a time counter 86 enabled by the time-zero pulse at 826 milliseconds, comparator 87 putting out the end-of-record signal when the indication of counter 86 reached the record-length setting of switch 85.

Figure 3:
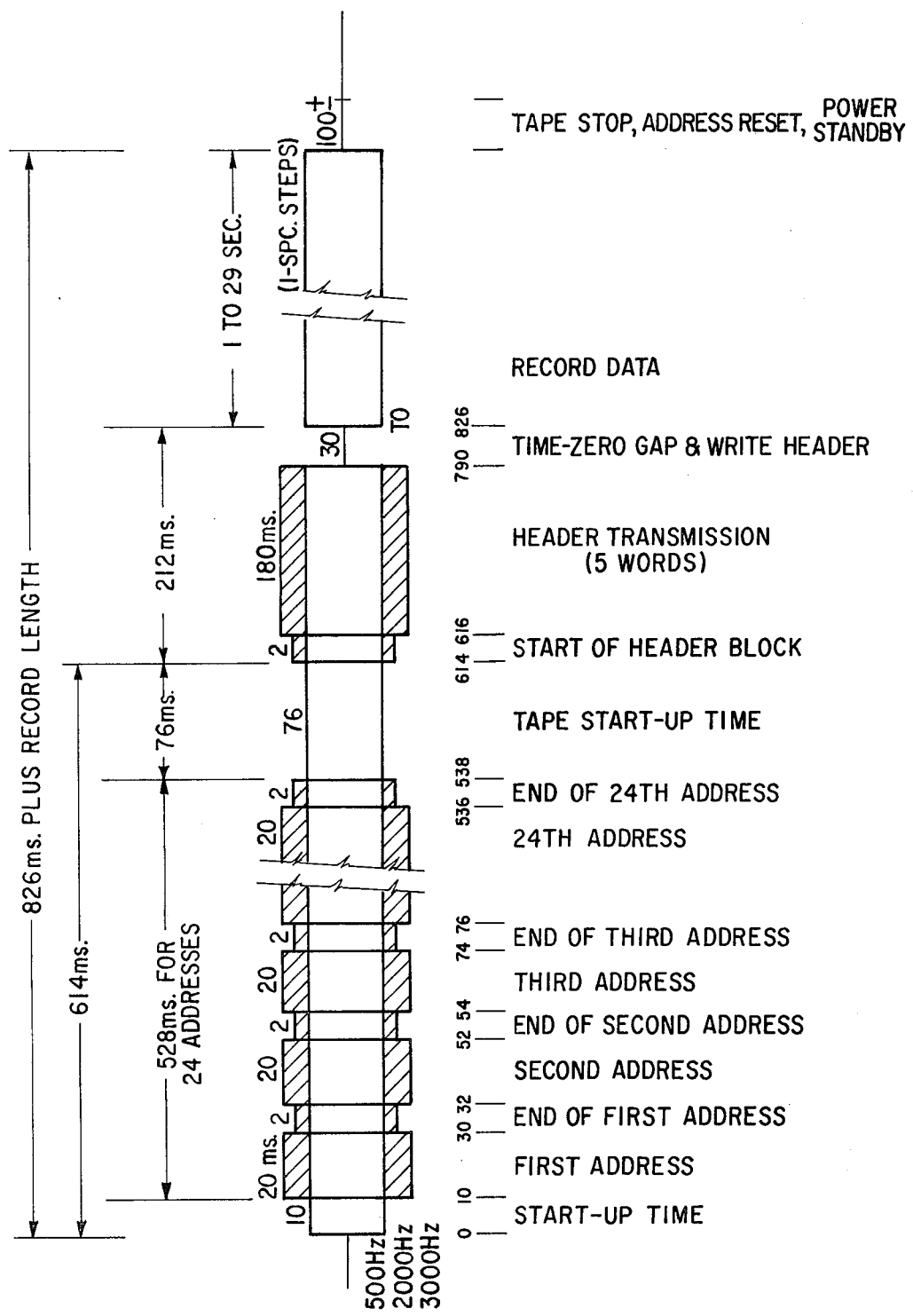
FIG. 3 is a graphic diagram of the control-signal transmissions used in a typical operation of the invention.

FIG. 3 shows diagrammatically and graphically the general sequence of tone signals transmitted by radio transmitter 48 of FIG. 2 to control the remote receiver recorders. Essentially, this is a typical timing sequence which might be provided by the program counter 55 operating to generate and transmit 24 two-digit address codes for the 24 remote recording units typical of many field operations. Time proceeds from left to right along the diagram of FIG. 3, the length of interval and of interval groups being shown above the graph in milliseconds, while the elapsed time from zero time of turn-on by switch 56 of the radio transmitter 48 in milliseconds is shown below. The three different widths of the bar graph indicate the modulating tones which are present on the radio carrier, the straight center line showing no tone modulation. Beginning at the left, time zero corresponds to the depressing of start pushbutton 56, followed by ten milliseconds of 500-hz tone transmission terminating with the delayed start signal put out by counter 55 on line 55b. The next 528 milliseconds are utilized in scanning matrix 30 and transmitting the BCD bits of the 24 two-digit numbers selected therein as the set of coded signals, the 20 milliseconds representing the transmission time of ten bits at the rate of 2 milliseconds per bit. The cross-hatching of the bar graph of FIG. 3 is intended to represent on-off modulation of the 3,000-hz tone, a one bit corresponding to a 2-millisecond burst of the 3,000-hz, while a zero bit is a 2-millisecond interruption of the 3,000-hz tone. The end of each address code is marked by transmission of a 2-millisecond burst of 2,000-hz tone.

As each address is received and decoded by one corresponding remote receiver recorder, complete turn-on of its recording mechanism, including starting of the tape transport, occurs. In order that the last ones of the recorders to be turned on may stabilize and the tape drive come up to speed, the end signal of the last address is followed by a 76-millisecond interval at the end of which all recorders are fully operative. Next follows a 2-millisecond burst of 2,000 hz triggered by counter 55 on its output lead 55b and signaling the start of the header-block transmission. Next follows a 180-millisecond interval, during which the header transmission of five words takes place. Each word comprising 18 bits for a total of 90 bits is transmitted at the rate of one bit per 2 milliseconds, thus accounting for the 180-millisecond interval.

At the end of the header transmission, there is a 30-millisecond gap, during which no tone is transmitted. This is the time-zero gap during which the header data are transferred from temporary storage in each recorder unit to the now-moving recording tape. At the end of the 30-millisecond gap occurs the time break at $T_0$, followed by the recording of seismic data for whatever length of time is preset on record-length switch 85. The 500-hz tone is present throughout the entire recording interval to serve as a clock synchronizing all recorders. Termination of the 500-hz tone at the end of the allotted recording time causes the tape transport to stop, registers and flip-flops to be reset, and the power at the remote recording units to return to radio-standby status.

It should be emphasized that the time and frequency format of FIG. 3 is only one example of many possible control-signal sequences. The three-digit BCD address code signals of FIG. 1, for example, would each require 30 ms. for transmission, and recording more or fewer than 24 traces would alter the elapsed time between control-system turn-on and the $T_0$ start of data recording. Likewise, the order of recording the record header first and the received seismic data second could be reversed, so long as they are placed adjacent each other on the tape.

Figure 4:
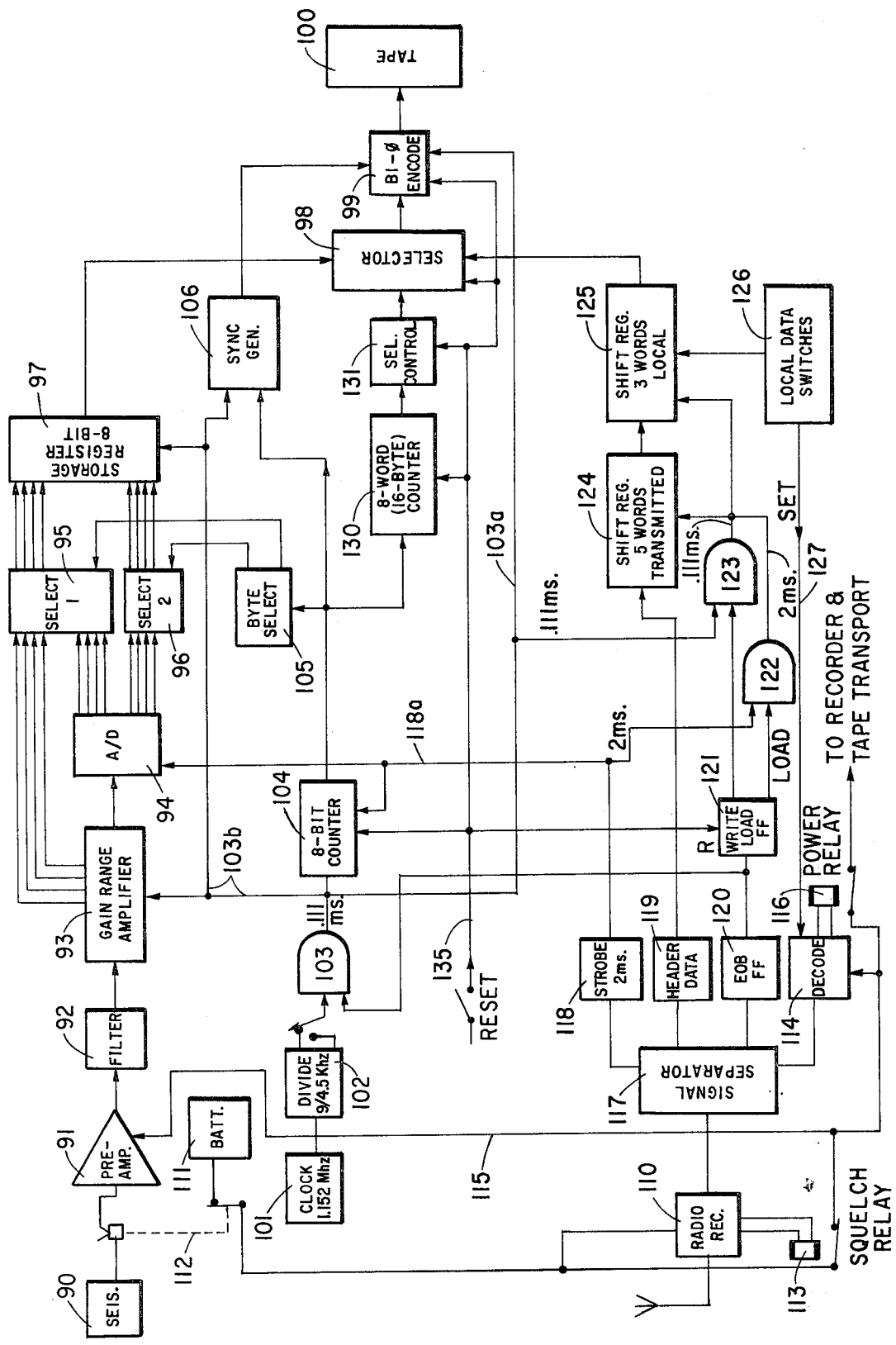
FIG. 4 is a block wiring diagram of a preferred embodiment of the recording unit of the system of the invention.

Turning now to FIG. 4, this figure shows in block-diagram form the main components of each of the receiver-recording units for recording one of the final record traces. In general, the upper portion of the figure shows the seismic-data processing circuits, and the center portion supplies the clocking or timing pulses, while the bottom portion provides the record-header information Signals received from a seismometer or seismometer group 90 are amplified by a preamplifier 91 and filtered, if desired, by a filter 92, followed by further variable amplification by a gain-ranging multi-stage amplifier 93. The amplified analog signal is then converted on command to digital form by an analog-digital converter 94 and, along with the instantaneous value of gain of amplifier 93 is alternately transferred by byte select gates 95 and 96 to an 8-bit storage register 97. From there, the stored bits are read out in sequence through a selector 98 to a bi-phase encoder 99, which puts the digital data into a form suitable for recording as serial bits by a small tape recorder 100.

Bit-timing in this recording system is under the control of a conventional crystal oscillator clock 101 typically operating at a frequency of 1.52 megahertz (mhz) into a divider 102, which produces two lower frequency outputs, one at 9 khz and the other at 4.5 khz. The 9-khz bit rate is used with a sample interval of 2 milliseconds, which is in present widespread use in seismic geophysical surveying, while the 4.5 kilohertz output is available if it is desired to utilize a 4-millisecond sample interval. In the present example, it will be assumed that the 9-kilohertz, 2-millisecond sample interval is employed. This frequency is transmitted through a gate 103 to a counter 104, which has the function of subdividing the bit stream into bytes of eight impulses each followed by a one-bit gap. A byte-select flip-flop 105 recognizes the gaps and alternately enables the transfer of digital bits by the byte-select gates 95 and 96 to the read-out register 97 for serial read-out to tape 100. The output of counter 104 is also utilized by a sync generator 106 that provides to encoder 99 synchronizing signals or impulses that insure proper grouping of the recorded bit stream into sequential words.

Each receiver-recorder unit also includes a conventional radio receiver 110 tuned to the transmission from transmitter 48 of FIG. 2, energized by a battery 111. An inter-connection indicated at 112 insures turn-on of radio 110 by connection to battery 111 when seismometer group 90 is plugged in to the input of preamplifier 91. Included in the circuit of radio-receiver 110 is a squelch relay 113 which is normally open in the absence of a transmitted and received signal. Upon receipt of the carrier from transmitter 48, however, relay 113 closes and applies voltage from battery 111 to decoder unit 114 and over lead 115 to preamplifier 91. Then, if and when the particular BCD-coded signal which decoder 114 is set to recognize is received, a power relay 116 closes to also transmit battery voltage to the rest of the recorder circuits and to the tape transport mechanism.

The various tone signals sent from transmitter 48 to radio-receiver 110 are supplied by the receiver to a signal-separating means 117, comprising various filters and logic circuits not shown in detail, which provides to an output unit 118 strobe or sample-timing pulses at 2-millisecond intervals corresponding to the 500-hz transmission of radio transmitter 48. The BCD-coded address signals received from read-out of shift register 35 through transmitter 48 are routed to decoder 114, which is preset to be actuated only if one particular coded signal is received. If, during the transmission of the address signals, none is received that matches the code set into decoder 114, relay 116 remains open and no power is transmitted to the main recorder and tape transport circuits.

Assuming that power turn-on does occur, a unit 119 recognizes the start-of-header-block signal at elapsed time 614 of FIG. 3, and routes the subsequent transmission of header-data bits into a shift register 124 for temporary storage. An end-of-block flip-flop 120 recognizes the end of the header transmission at elapsed time 796 of FIG. 3 and changes a flip-flop 121 from a "load" to a "write" mode. In the load mode, flip-flop 121 supplies enabling voltage to a gate 122 through which 500-hz pulses at 2-millisecond intervals are transmitted to the load-write terminals of shift registers 124 and 125. Thus, the header data from unit 119 is placed in shift register 124 at the relatively slow transmitted rate of 500 bits per second or 2 milliseconds per bit, while simultaneously up to three words of data characterizing the local receiver recorder unit and preset on switches 126 are placed in storage in register 125. At the same time that local data are entered by setting switches 126, decoder 114 is set over lead 127 to respond to the particular coded call signal associated with the position occupied by seismometer group 90. This is typically entered at the time that the seismometers are placed in position on the ground, and the position number is transferred by switches 126 to the receiver recorder employed for that seismometer group. Changing of flip-flop 121 to the write mode enables a gate 123 to supply the 9-khz frequency to the read-write terminals of registers 124 and 125, so that shifting out of the bits stored therein occurs at the 18-times higher frequency through selector 98 and encoder 99 to recorder 100.

The shifting of flip-flop 121 by end-of-block detector 120 to the write mode also enables gate 103 to transmit 9-khz pulses to counter 104, as well as to gate 123. The byte-output counts of counter 104 are also transmitted to a preset eight-word (or 16-byte) counter 130 which at the end of eight words, through a selector control 131 shifts selector 98 from the output of shift registers 124, 125 to the output of data register 97. This marks the end of the transfer of the header-block data to tape recorder 100 and the start of recording of the seismic data from receiver 90.

Synchronism between all of the energized recorders operating for making all the traces of a given multi-trace seismic record is insured by transmitting as digitizing commands to unit 94 the 500-hz, 2-millisecond-spaced control impulses by output lead 118a from strobe unit 118. A connection also between counter 104 and lead 118a maintains a constant relationship between the basic 500-hz control frequency and the counting of bytes by counter 104. Likewise, the 9-khz bit rate established by clock 101 is transferred by a lead 103a to encoder 99 and gate 123 and by a lead 103b to gain-ranging amplifier 93, shift register 97 and sync generator 106. Ranging by amplifier 93 accordingly takes place at the relatively high 9-khz bit rate, as does the clocking out of the stored bits from register 97.

At the conclusion of recording each trace, or at any other appropriate time, resetting of the various counters and flip-flops is done by a voltage pulse on a lead 135 extending to the various reset terminals.

While the foregoing description of the prototype of a preferred embodiment of the invention has shown a single control unit operating a number of remote recording units, each recording a single trace in common-depth-point profiling along a survey line, a number of modifications also utilizing the principles of the invention should now be apparent. The seismometers or seismometer groups might be arranged in a two-dimensional areal array and different records made by quite varied selections of the units to be turned on for each record. More than one control unit and associated source might be used to speed up a surveying operation, by alternately or in sequence turning on different sets of recorders with one control and source unit while the other or others are moving to new source-point locations.

Likewise, a single radio receiver and tape recorder might serve two or more adjacent seismometers or groups, by simultaneously recording two or more tracks side-by-side on the tape. Two or more independent record-header and seismic-signal digitizing channels in the same unit housing would probably be required, but some of the local clock and counter units might readily be shared. Instead of synchronizing the sampling and recording of the digital data by all units from the control-unit clock, sufficiently accurate data timing might be done by the local clock in each unit, with only the transmission of a time-break or occasional synchronizing impulses from the control unit to establish a common time base for all the traces of a record.

For digital-computer processing of the field data obtained using this invention, the usual first step is to transfer the data from the small individual field-tape reels or cassettes to a standard computer tape which can be handled thereafter at the high tape speeds and bit rates characteristic of digital computers. For example, nine cassette tapes might first be read simultaneously and re-written onto a standard nine-track computer magnetic tape using buffer storages, if desired, to compensate for any variations of tape transport speed, timing, and the like, occurring among the individual field recorder units. Once it has been determined by further processing, monitoring, or the like, that the transfer is successful, the field tapes can then be erased and returned to the field work location for reuse.

One reason for using 18 bits, or two nine-bit bytes, as the basic word length in the field recordings is the better compatibility with any standard nine-track magnetic tape recording format commonly used by digital computers. That is, the data can be easily re-formatted or manipulated in any way desired to adapt them for further processing by any of the standard computers and programs in common daily use.

We claim:

1. In apparatus for seismic geophysical surveying comprising means for generating seismic waves in the earth at one source location within a survey area that includes a plurality of spaced source locations, transducer means distributed over said area for receiving said seismic waves after travel through the earth from each of said source locations to each of a plurality of receiving locations spaced from each other within said area, and means for recording the outputs of said receiving-transducer means as a plurality of record traces, the improvement in which said recording means comprises a plurality of recorder units each being connected to the output of at least one of said receiving-transducer means and adapted to record at least one of said traces, all of said units being in a standby status to receive only communications until energized by connection to a supply of electrical power to record a trace, and said each unit being positioned in said area near the receiving location occupied by said connected receiving-transducer means, each of said recorder units comprising means responsive to one of a set of coded signals, transmitted over a communications link from a control point, to connect said recorder unit to a supply of electrical power, means for recording a first sequence of digital bits representing record-identification and recording-parameter data, and means for recording a second sequence of digital bits representing successively sampled wave-amplitudes characterizing the seismic waves arriving at said connected receiving-transducer means, said improvement including also means at said control point for transmitting a set of coded signals to energize only those of said recorder units forming a recording array having a desired relationship to said one source location, to simultaneously record the plurality of traces forming one multi-trace seismic record.

2. Apparatus for seismic geophysical surveying as in claim 1 in which said coded-signal responsive means includes adjusting means by which said signal responsive means can be set to respond to a coded signal related to the position occupied by said connected receiving-transducer means in said plurality of receiving locations.

3. Apparatus for seismic geophysical surveying as in claim 2 in which said adjusting means comprises a plurality of adjustable switch means.

4. Apparatus for seismic geophysical surveying as in claim 1 including also means to change said set of coded signals to maintain said recording array in said desired relationship to different source locations occupied in said survey area.

5. Apparatus for seismic geophysical surveying as in claim 1 including also means to transmit from said control point, over a communications link of limited band width, record-identification and recording-parameter data at a first relatively slow rate, means in each of said recording units to receive and store said data temporarily, and means to transfer said data from said temporary storage means to a recorded trace within said unit at a second, higher rate.

6. A seismic digital trace recorder connected to at least one seismic-wave receiver comprising means responsive to a transmitted coded signal to activate said recorder by connecting it to a supply of electrical power, means in said recorder for receiving and storing a first sequence of digital bits representing record-identification and recording-parameter data, means for transferring said stored first bit sequence to an elongated record-receiving surface in said recorder, and means for successively sampling the output of said seismic-wave receiver and impressing on said record-receiving surface a second sequence of digital bits characterizing received seismic waves.

7. In a method of seismic geophysical surveying comprising generating seismic waves at each of a plurality of locations in a prospecting area and receiving, after travel by various paths through the earth, the resulting seismic waves arriving at a plurality of spaced receiving locations distributed over at least part of said area, the steps which comprise assigning to each of said receiving locations in said area a different identification or address word containing at least two alphanumeric characters, placing at each of said receiving locations at least one seismic-wave receiving transducer connected to a recorder unit nearby for recording the output of said transducer as one trace of a multi-trace seismic record, said recorder unit including an adjustable signal decoder, adjusting said decoder to produce a response only upon the receipt by said decoder, in the form of a coded signal transmitted from a control point, of the identification or address word assigned to the receiving location occupied by said connected transducer, said decoder being connected to means for utilizing said response to activate said recorder unit for recording a record trace, and, immediately prior to wave generation at each of said generating locations, transmitting in coded-signal form from a control point to all of said receiving locations the identification or address words of only those receiving locations from which a trace is required for inclusion in a given multi-trace record.

8. A method of seismic geophysical surveying as in claim 7 in which each of said identification or address words is a number containing at least two digits.

9. A method of seismic geophysical surveying as in claim 8 in which said transmitting step comprises transmitting, as said coded-signal form, the binary-coded-decimal equivalents of the digits forming said identification or address numbers.

* * * * *